US010555212B2

(12) United States Patent
Lin (10) Patent No.: US 10,555,212 B2
(45) Date of Patent: Feb. 4, 2020

(54) METHOD AND DEVICE FOR SENDING AND CONTROLLING FEEDBACK INFORMATION (71) Applicant: China Academy of Telecommunications Technology, Beijing (CN)

(72) Inventor: Yanan Lin, Beijing (CN)

(*) Notice: Subject to any disclaimer, the term of this patent is extended or adjusted under 35 U.S.C. 154(b) by 51 days.

(21) Appl. No.: 15/562,896

(22) PCT Filed: Mar. 30, 2016

(86) PCT No.: PCT/CN2016/077882
§ 371 (c)(1),
(2) Date: Sep. 29, 2017

(87) PCT Pub. No.: WO2016/155628
PCT Pub. Date: Oct. 6, 2016

(65) Prior Publication Data
US 2018/0084457 A1 Mar. 22, 2018

(30) Foreign Application Priority Data
Apr. 1, 2015 (CN) .......................... 2015 1 0153047

(51) Int. Cl.
*H04W 28/06* (2009.01)
*H04L 1/16* (2006.01)
(Continued)

(52) U.S. Cl.
CPC .......... *H04W 28/06* (2013.01); *H04L 1/1692* (2013.01); *H04L 1/1854* (2013.01); *H04L 5/0053* (2013.01); *H04W 72/0446* (2013.01)

(58) Field of Classification Search
CPC .............. H04W 28/06; H04W 72/0446; H04L 5/0055; H04L 5/001; H04L 1/1864;
(Continued)

(56) References Cited

U.S. PATENT DOCUMENTS

2010/0260135 A1* 10/2010 Fan ..................... H04L 1/1854
370/329
2012/0155413 A1 6/2012 Liu et al.
(Continued)

FOREIGN PATENT DOCUMENTS

CN 102075313 A 5/2011
CN 102088341 A 6/2011
(Continued)

OTHER PUBLICATIONS

3GPP TSG RAN WG1 Meeting #80, "HARQ-ACK transmission for supporting CA of up to 32 carriers", R1-150209, Athens, Greece, Feb. 9-13, 2015, 5 pages.
(Continued)

*Primary Examiner* — Jackie Zuniga Abad
(74) *Attorney, Agent, or Firm* — Kilpatrick Townsend & Stockton, LLP (57) ABSTRACT Disclosed are a method and device for sending and controlling feedback information, which are used to reduce redundant information in a feedback information sequence so as to decrease transmit power required for feedback information, save required physical resources, improve transmission performance of the feedback information and increase the resource utilization rate of the entire system. A method for sending feedback information provided in the present application comprises: a user equipment (UE) receives indication information sent by a network side and used for indicating a feedback information sequence length; the UE determines a feedback information sequence according to the feedback information sequence length indicated in the indication information; and the UE sends the determined feedback information sequence to the network side.

24 Claims, 4 Drawing Sheets (51) Int. Cl.
H04L 1/18 (2006.01)
H04L 5/00 (2006.01)
H04W 72/04 (2009.01)

(58) Field of Classification Search
CPC ... H04L 1/1861; H04L 5/0053; H04L 1/1854; H04L 1/1692; H04L 1/16
See application file for complete search history.

(56) References Cited

U.S. PATENT DOCUMENTS

2013/0258914 A1* 10/2013 Seo ............... H04L 1/1896 370/280
2013/0265946 A1* 10/2013 Gao ............... H04L 1/1854 370/329

FOREIGN PATENT DOCUMENTS

| | | |
|---|---|---|
| CN | 102377536 A | 3/2012 |
| CN | 102647261 A | 8/2012 |
| CN | 102835057 A | 12/2012 |
| EP | 2693675 A1 | 2/2014 |
| KR | 20130087541 A | 8/2013 |

OTHER PUBLICATIONS

3GPP TSG-RAN WG1 #80, "Views on UL control enhancements for CA operation", R1-150237, Athens, Greece, Feb. 9-13, 2015, 4 pages.
3GPP TSG-RAN WG1 #80, "Uplink control signaling enhancements for b5c CA", R1-150489, Athens, Greece, Nov. 17-21, 2014, 9 pages.

* cited by examiner

METHOD AND DEVICE FOR SENDING AND CONTROLLING FEEDBACK INFORMATION

CROSS REFERENCE TO RELATED APPLICATION

This application is a National Stage of International Application No. PCT/CN2016/077882, filed Mar. 30, 2016, which claims priority to Chinese Patent Application No. 201510153047.6, filed Apr. 1, 2015, both of which are hereby incorporated by reference in its entirety.

FIELD

The present application relates to the field of communications, and particularly to a method and device for transmitting feedback information, and a method and device for controlling transmission of feedback information.

BACKGROUND

Figure 1:
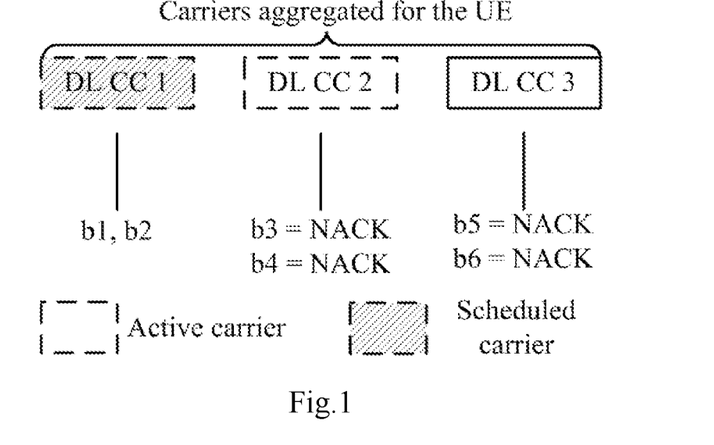
FIG. 1 is a schematic principle diagram of a method for generating ACK/NACK feedback information in the LTE Rel-10 in the prior art.

Aggregation of at most five carriers is supported in the Long Term Evolution (LTE) Release 10 (Rel-10) carrier aggregation technologies. An eNB semi-statically configures component carriers to be aggregated for respective User Equipments (UEs). The configured component carriers are further categorized into active carriers and inactive carriers, and the eNB schedules data transmission only over the active carriers. The eNB activates and deactivates the configured carriers in a Media Access Control (MAC) Control Element (CE). If a UE determines the total amount of Acknowledgement (ACK)/Non-Acknowledgement (NACK) feedback information according to the number of active carriers, then the eNB may have different understanding of the total amount of ACK/NACK feedback information from the UE while the carriers are being activated and deactivated, and thus may fail to receive the ACK/NACK feedback information correctly. Accordingly the UE always determines the length of a sequence of feedback information according to the number of configured component carriers as specified in the LTE Rel-10. As illustrated in FIG. 1, the eNB configures the UE with three component carriers including DL CC1, DL CC2, and DL CC3, activates two of them, including the carrier DL CC1 and the carrier DL CC2, and schedules data transmission in the carrier DL CC1 in some sub-frame; and if a Multiple Input Multiple Output (MIMO) transmission mode is configured, and at most two Transport Blocks (TBs) are transmitted over each Physical Downlink Shared Channel (PDSCH), then the length of a sequence of ACK/NACK feedback information to be transmitted by the UE to the eNB may be 6, where feedback information corresponding to the active carrier DL CC2 which is not scheduled, and the inactive carrier DL CC3 is set to NACK.

Aggregation of at most 32 carriers is supported in the LTE Release 13 (Rel-13) carrier aggregation technologies. As there are a growing number of carriers to be aggregated, the UE will also transmit a significantly growing amount of ACK/NACK feedback information. If the length of a sequence of feedback information is still determined according to the number of configured carriers, then if the eNB configures the UE with a large number of component carriers, but there are a small number of component carriers which are really activated or scheduled, then there will be a large amount of redundant information in the sequence of ACK/NACK feedback information. The UE has to transmit a large amount of ACK/NACK feedback information over more physical resources and at higher transmit power, thus degrading both the performance of transmitting the ACK/NACK feedback information, and the utilization ratio of the resources throughout the system.

In summary, in the existing carrier aggregation system, the length of a sequence of ACK/NACK feedback information is determined according to the number of configured component carriers, and if aggregation of at most 32 carriers is supported by the system, then there may be such a large amount of redundant information in the sequence of feedback information in the prior art that may consume higher transmit power and more physical resources, thus degrading the transmission performance and degrading the utilization ratio of the resources.

SUMMARY

Embodiments of the application provide a method and device for transmitting feedback information, and a method and device for controlling transmission of feedback information so as to reduce the amount of redundant information in a sequence of feedback information to lower transmit power to be occupied by the feedback information, to save physical resources to be occupied, and to improve the performance of transmitting the feedback information, and the utilization ratio of the resources throughout the system.

An embodiment of the application provides a method for transmitting feedback information, the method includes:

receiving, by a User Equipment (UE), an indicator transmitted by a network side to indicate a length of a sequence of feedback information;

determining, by the UE, a sequence of feedback information according to the length of a sequence of feedback information, indicated in the indicator; and transmitting, by the UE, a determined sequence of feedback information to the network side.

In the embodiment of the application, the UE determines the sequence of feedback information according to the length of a sequence of feedback information, indicated in the indicator transmitted by the network side to indicate the length of a sequence of feedback information, and transmits the determined sequence of feedback information to the network side, to thereby avoid the problem in the prior art the length of a sequence of feedback information is determined according to the number of configured component carriers, thus resulting in a large amount of redundant information in the sequence of feedback information, so the method according to the embodiment of the application can reduce the amount of redundant information in the sequence of feedback information to lower transmit power to be occupied by the feedback information, save physical resources to be occupied, and improve the performance of transmitting the feedback information, and the utilization ratio of the resources throughout the system.

Preferably the UE transmits the determined sequence of feedback information to the network side in a Physical Uplink Control Channel (PUCCH) format, in which the sequence of feedback information can be carried, and which has the least capacity, to thereby improve the performance of demodulation so as to enable a larger number of UEs to access concurrently.

Preferably before the UE receives the indicator transmitted by the network side to indicate the length of a sequence of feedback information, the method further includes:

receiving, by the UE, a set of lengths of a sequence of feedback information, transmitted by the network side, including P different lengths of a sequence of feedback information, $\{L_1, L_2, \ldots, L_P\}$, wherein $$L_j \le \sum_{i=1}^{N} C_i \cdot M_i,$$

j=1, 2, . . . , P, P represents an integer more than 1, N represents the number of component carriers configured by the network side to be aggregated for the UE, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i;

wherein the length of a sequence of feedback information indicated in the indicator belongs to the set of lengths of a sequence of feedback information.

Preferably the indicator is Downlink Control Information (DCI).

Preferably if the UE receives a plurality of pieces of DCI in a joint feedback set, then each piece of DCI will indicate a same length of a sequence of feedback information, wherein the joint feedback set is a set of downlink sub-frames for which feedback information is transmitted in a same uplink sub-frame.

Preferably the method further includes: obtaining, by the UE a joint counter from DCI scheduling transmission of a Physical Downlink Shared Channel (PDSCH), or DCI for which feedback information needs to be replied with, in the joint feedback set, wherein the joint counter indicates an order in which the DCI is received; and determining, by the UE, the sequence of feedback information according to the length of a sequence of feedback information, indicated in the indicator includes:

determining, by the UE, a bit position, of feedback information corresponding to the PDSCH or the DCI, in the sequence of feedback information according to the joint counter; and determining, by the UE, the sequence of feedback information according to the length of a sequence of feedback information, indicated in the indicator, and the bit position.

An embodiment of the application provides a method for controlling transmission of feedback information, the method includes:

determining, by a network side, a length of a sequence of feedback information to be indicated to a User Equipment (UE);

transmitting, by the network side, an indicator indicating the length of a sequence of feedback information to the UE.

Preferably before the network side determines the indicator indicating the length of a sequence of feedback information, the method further includes: transmitting, by the network side, a set of lengths of a sequence of feedback information, including P different lengths of a sequence of feedback information, $\{L_1, L_2, \ldots, L_P\}$, to the UE, wherein $$L_j \le \sum_{i=1}^{N} C_i \cdot M_i,$$

j=1, 2, . . . , P, P represents an integer more than 1, N represents the number of component carriers configured by the network side to be aggregated for the UE, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i; and determining, by the network side, the length of a sequence of feedback information to be indicated to the UE includes:

selecting, by the network side, one of the lengths of a sequence of feedback information in the set of lengths of a sequence of feedback information as the length of a sequence of feedback information to be indicated to the UE.

Preferably the indicator is Downlink Control Information (DCI).

Preferably transmitting, by the network side, an indicator indicating the length of a sequence of feedback information to the UE includes:

transmitting, by the network side, a plurality of pieces of DCI, each of which indicates a same length of a sequence of feedback information, to the UE in a joint feedback set, wherein the joint feedback set is a set of downlink sub-frames for which feedback information is transmitted in a same uplink sub-frame.

Preferably the method further includes:

setting, by the network side, a joint counter in DCI scheduling transmission of a Physical Downlink Shared Channel (PDSCH), or DCI for which feedback information needs to be replied with, in the joint feedback set, wherein the joint counter indicates an order in which the DCI is transmitted, so that the UE determines a bit position, of feedback information corresponding to the PDSCH or the DCI, in the sequence of feedback information according to the joint counter.

Preferably after the network side transmits the indicator indicating the length of a sequence of feedback information to the UE, the method further includes:

receiving, by the network side, a sequence of feedback information with which the UE replies, wherein the sequence of feedback information is transmitted by the UE to the network side in a Physical Uplink Control Channel (PUCCH) format, in which the sequence of feedback information can be carried, and which has the least capacity.

An embodiment of the application provides a device for transmitting feedback information, the device includes:

a receiving unit configured to receive an indicator transmitted by a network side to indicate a length of a sequence of feedback information;

a determining unit configured to determine a sequence of feedback information according to the length of a sequence of feedback information, indicated in the indicator; and a transmitting unit configured to transmit a determined sequence of feedback information to the network side.

Preferably the transmitting unit transmits the determined sequence of feedback information to the network side in a Physical Uplink Control Channel (PUCCH) format, in which the sequence of feedback information can be carried, and which has the least capacity.

Preferably the receiving unit is further configured, before the device receives the indicator transmitted by the network side to indicate the length of a sequence of feedback information:

to receive a set of lengths of a sequence of feedback information, transmitted by the network side, including P different lengths of a sequence of feedback information, $\{L_1, L_2, \ldots, L_n\}$, wherein $$L_j \le \sum_{i=1}^{N} C_i \cdot M_i,$$

j=1, 2, ..., P, P represents an integer more than 1, N represents the number of component carriers configured by the network side to be aggregated for the device, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i;

wherein the length of a sequence of feedback information indicated in the indicator belongs to the set of lengths of a sequence of feedback information.

Preferably the indicator is Downlink Control Information (DCI).

Preferably if the receiving unit receives a plurality of pieces of DCI in a joint feedback set, then each piece of DCI will indicate a same length of a sequence of feedback information, wherein the joint feedback set is a set of downlink sub-frames for which feedback information is transmitted in a same uplink sub-frame.

Preferably the receiving unit is further configured:

to obtain a joint counter from DCI scheduling transmission of a Physical Downlink Shared Channel (PDSCH), or DCI for which feedback information needs to be replied with, in the joint feedback set, wherein the joint counter indicates an order in which the DCI is received; and the determining unit is configured:

to determine a bit position, of feedback information corresponding to the PDSCH or the DCI, in the sequence of feedback information according to the joint counter; and to determine the sequence of feedback information according to the length of a sequence of feedback information, indicated in the indicator, and the bit position.

An embodiment of the application provides a device for controlling transmission of feedback information, the device includes:

a determining unit configured to determine a length of a sequence of feedback information to be indicated to a User Equipment (UE);

a transmitting unit configured to transmit an indicator indicating the length of a sequence of feedback information to the UE.

Preferably before the indicator indicating the length of a sequence of feedback information is determined, the transmitting unit is further configured to transmit a set of lengths of a sequence of feedback information, including P different lengths of a sequence of feedback information, $\{L_1, L_2, \ldots, L_P\}$, to the UE, wherein $$L_j \leq \sum_{i=1}^{N} C_i \cdot M_i,$$

j=1, 2, ..., P, P represents an integer more than 1, N represents the number of component carriers configured by the network side to be aggregated for the UE, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i; and the determining unit is configured to select one of the lengths of a sequence of feedback information in the set of lengths of a sequence of feedback information as the length of a sequence of feedback information to be indicated to the UE.

Preferably the indicator is Downlink Control Information (DCI).

Preferably the transmitting unit is configured:

to transmit a plurality of pieces of DCI, each of which indicates a same length of a sequence of feedback information, to the UE in a joint feedback set, wherein the joint feedback set is a set of downlink sub-frames for which feedback information is transmitted in a same uplink sub-frame.

Preferably the transmitting unit is further configured to set a joint counter in DCI scheduling transmission of a Physical Downlink Shared Channel (PDSCH), or DCI for which feedback information needs to be replied with, in the joint feedback set, wherein the joint counter indicates an order in which the DCI is transmitted, so that the UE determines the bit position, of feedback information corresponding to the PDSCH or the DCI, in the sequence of feedback information according to the joint counter.

Preferably the transmitting unit is further configured, after the indicator indicating the length of a sequence of feedback information is transmitted to the UE:

to receive a sequence of feedback information with which the UE replies, wherein the sequence of feedback information is transmitted by the UE to the network side in a Physical Uplink Control Channel (PUCCH) format, in which the sequence of feedback information can be carried, and which has the least capacity.

DETAILED DESCRIPTION OF THE EMBODIMENTS

Embodiments of the application provide a method and device for transmitting feedback information, and a method and device for controlling transmission of feedback information so as to reduce the amount of redundant information in a sequence of feedback information to lower transmit power to be occupied by the feedback information, to save physical resources to be occupied, and to improve the performance of transmitting the feedback information, and the utilization ratio of the resources throughout the system.

Figure 2:
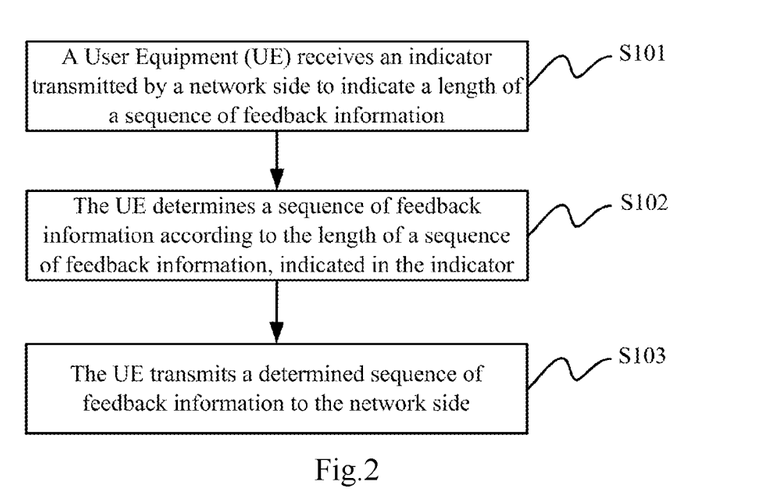
FIG. 2 is a schematic flow chart of a method for transmitting feedback information according to an embodiment of the application.

Referring to FIG. 2, an embodiment of the application provides a method for transmitting feedback information at the UE side, where the method includes the following operations.

In the operation S101, a User Equipment (UE) receives an indicator transmitted by a network side to indicate a length of a sequence of feedback information.

In the operation S102, the UE determines a sequence of feedback information according to the length of a sequence of feedback information, indicated in the indicator.

In the operation S103, the UE transmits a determined sequence of feedback information to the network side.

In the embodiment of the application, the feedback information may be ACK/NACK feedback information, or another type of feedback information.

In the embodiment of the application, the UE determines the sequence of feedback information according to the length of a sequence of feedback information, indicated in the indicator transmitted by the network side to indicate the length of a sequence of feedback information, and transmits the determined sequence of feedback information to the network side, to thereby avoid the problem in the prior art the length of a sequence of feedback information is determined according to the number of configured component carriers, thus resulting in a large amount of redundant information in the sequence of feedback information, so the method according to the embodiment of the application can reduce the amount of redundant information in the sequence of feedback information to lower transmit power to be occupied by the feedback information, save physical resources to be occupied, and improve the performance of transmitting the feedback information, and the utilization ratio of the resources throughout the system.

Preferably before the UE receives the indicator transmitted by the network side to indicate the length of a sequence of feedback information, the method further includes:

the UE receives a set of lengths of a sequence of feedback information, transmitted by the network side, including P different lengths of a sequence of feedback information, $\{L_1, L_2, \ldots, L_P\}$, where $$L_j \leq \sum_{i=1}^{N} C_i \cdot M_i,$$

j=1, 2, ..., P, P represents an integer more than 1, N represents the number of component carriers configured by the network side to be aggregated for the UE, $M_i$ represents a total number of downlink sub-frames for which feedback information is transmitted in an uplink sub-frame n over a component carrier i, and $C_i$ represents the largest number of transport blocks which can be transmitted in each downlink sub-frame over the component carrier i;

where the length of a sequence of feedback information indicated in the indicator belongs to the set of lengths of a sequence of feedback information.

In the embodiment of the application, an executor of the operations at the network side can be an eNB or another network side device.

Preferably the indicator is Downlink Control Information (DCI).

In the embodiment of the application, the eNB can pre-configure the UE with several optional lengths of a sequence of feedback information semi-statically, and subsequently the eNB indicates one of the pre-configured optional lengths of a sequence of feedback information as L dynamically in the DCI, so that the UE determines the total length of ACK/NACK feedback information to be transmitted in the corresponding uplink sub-frame as L. The value of L is less than or equal to the length of a sequence of feedback information if all the component carriers among the carriers configured by the network side to be aggregated for the UE are activated and scheduled.

The UE receives configuration information of the eNB, where the configuration information is used for configuring P different lengths of a sequence of feedback information, $\{L_1, L_2, \ldots, L_P\}$, where $$L_j \leq \sum_{i=1}^{N} C_i \cdot M_i,$$

j=1, 2, ..., P, N represents the number of component carriers configured to be aggregated for the UE, $M_i$ represents the total number of downlink sub-frames for which feedback information is transmitted in an uplink sub-frame n over a component carrier i, and $C_i$ represents the largest number of Transport Blocks (TBs) which can be transmitted in a downlink sub-frame over the component carrier i. By way of an example in which there are three joint carriers, each of which corresponds to four downlink sub-frames, in each of which at most two transport blocks are transmitted, the largest value of L can be three carriers multiplied by four downlink sub-frames and further by two transport blocks, i.e., 24 bits.

The UE receives Downlink Control Information (DCI) transmitted by the eNB, and the UE determines the length L of feedback information according to the DCI, where $L \in \{L_1, L_2, \ldots, L_P\}$. The indicator of the length L of feedback information, carried in the DCI can be a particular value of L; or preferably can be an index of L in the set $L \in \{L_1, L_2, \ldots, L_P\}$ to thereby save a number of bits to be occupied for the indicator of the length L of feedback information as compared with the indicator indicating directly the particular value of L. The UE can determine the particular value of L according to the index of L in the set $L \in \{L_1, L_2, \ldots, L_P\}$, and the pre-obtained $\{L_1, L_2, \ldots, L_P\}$.

The user equipment transmits the sequence of feedback information with the total length L in the uplink sub-frame n.

Preferably the UE transmits the determined sequence of feedback information to the network side in a Physical Uplink Control Channel (PUCCH) format, in which the sequence of feedback information can be carried, and which has the least capacity, that is, if there are a number of PUCCH formats supported in the system, and there are different capacities of the different PUCCH formats, then the UE may determine one of the PUCCH formats for transmitting feedback information according to the determined length L of feedback information by selecting such one of the PUCCH formats, in which L bits of information can be carried, that has the least capacity, to thereby improve the performance of demodulation so as to enable a larger number of UEs to access concurrently.

Preferably if the UE receives a plurality of pieces of DCI in a joint feedback set, each of which indicates the same length of a sequence of feedback information, where the joint feedback set is a set of downlink sub-frames for which feedback information is transmitted in the same uplink sub-frame, then the UE will transmit the determined sequence of feedback information to the network side particularly by transmitting the determined sequence of feedback information to the network side in the same uplink sub-frame over the component carriers.

Preferably the method further includes: the UE obtains a joint counter from DCI scheduling transmission of a Physical Downlink Shared Channel (PDSCH), or DCI for which feedback information needs to be replied with, in the joint feedback set, where the joint counter indicates an order in which the DCI is received.

The UE determines the sequence of feedback information according to the length of a sequence of feedback information, indicated in the indicator particularly as follows:

the UE determines the bit position, of feedback information corresponding to the PDSCH or the DCI, in the sequence of feedback information according to the joint counter; and the UE determines the sequence of feedback information according to the length of a sequence of feedback information, indicated in the indicator, and the bit position.

For example, if the sequence number of the PDSCH is defined, then the position, of ACK/NACK feedback information corresponding to the PDSCH, in the sequence of feedback information may correspond to the sequence number thereof. For example, the position, of ACK/NACK feedback information corresponding to the first PDSCH, in the sequence of feedback information is also the first position.

Figure 3:
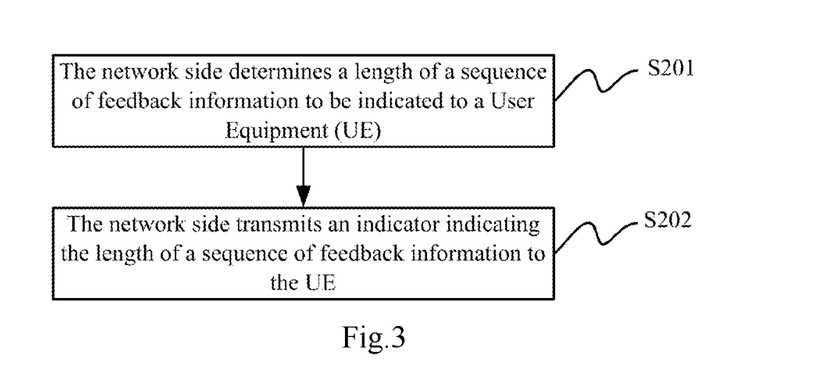
FIG. 3 is a schematic flow chart of a method for controlling transmission of feedback information according to an embodiment of the application.

Correspondingly referring to FIG. 3, an embodiment of the application provides a method for controlling transmission of feedback information at the network side, where the method includes the following operations.

In the operation S201, the network side determines a length of a sequence of feedback information to be indicated to a User Equipment (UE).

In the operation S202, the network side transmits an indicator indicating the length of a sequence of feedback information to the UE.

Preferably before the network side determines the indicator indicating the length of a sequence of feedback information, the method further includes: transmitting, by the network side, a set of lengths of a sequence of feedback information, including P different lengths of a sequence of feedback information, $\{L_1, L_2, \ldots, L_P\}$, to the UE, where $$L_j \leq \sum_{i=1}^{N} C_i \cdot M_i,$$

j=1, 2, ..., P, P represents an integer more than 1, N represents the number of component carriers configured by the network side to be aggregated for the UE, $M_i$ represents the total number of downlink sub-frames for which feedback information is transmitted in an uplink sub-frame n over a component carrier i, and $C_i$ represents the largest number of transport blocks which can be transmitted in each downlink sub-frame over the component carrier i; and the network side determines the length of a sequence of feedback information to be indicated to the UE by selecting one of the lengths of a sequence of feedback information in the set of lengths of a sequence of feedback information as the length of a sequence of feedback information to be indicated to the UE.

Preferably the indicator is Downlink Control Information (DCI).

Preferably the network side transmits the indicator indicating the length of a sequence of feedback information to the UE particularly as follows:

the network side transmits a plurality of pieces of DCI, each of which indicates the same length of a sequence of feedback information, to the UE in a joint feedback set, where the joint feedback set is a set of downlink sub-frames for which feedback information is transmitted in the same uplink sub-frame.

Preferably the method further includes:

the network side sets a joint counter in DCI scheduling transmission of a Physical Downlink Shared Channel (PDSCH), or DCI for which feedback information needs to be replied with, in the joint feedback set, where the joint counter indicates an order in which the DCI is transmitted, so that the UE determines the bit position, of feedback information corresponding to the PDSCH or the DCI, in the sequence of feedback information according to the joint counter.

Preferably after the network side transmits the indicator indicating the length of a sequence of feedback information to the UE, the method further includes:

the network side receives a sequence of feedback information with which the UE replies, where the sequence of feedback information is transmitted by the UE to the network side in a Physical Uplink Control Channel (PUCCH) format, in which the sequence of feedback information can be carried, and which has the least capacity.

A particular embodiment of the application will be exemplified below.

Figure 4:
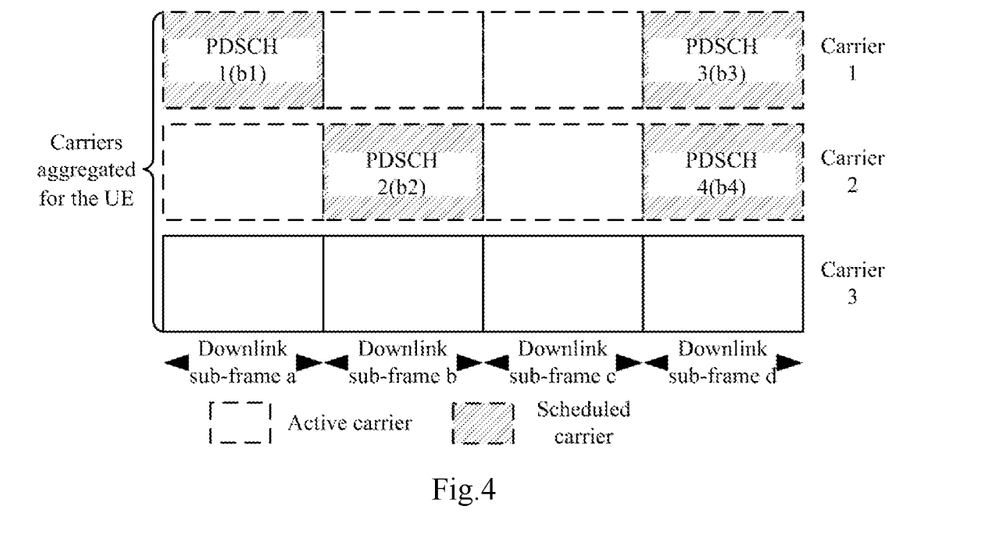
FIG. 4 is a schematic principle diagram of a method for generating a sequence of feedback information according to an embodiment of the application.

Referring to FIG. 4, in a Time Division Duplex (TDD) system, if a UE is configured with three component carriers to be aggregated, i.e., a carrier 1, a carrier 2, and a carrier 3 respectively, to all of which the same TDD uplink/downlink configuration is applied, and there are two active component carriers including the carrier 1 and the carrier 2 respectively, where a uni-code word transmission mode is configured, and ACK/NACK feedback information corresponding to downlink sub-frames a, b, c, and d are transmitted in the same uplink sub-frame n.

The eNB configures a set of lengths of a sequence of feedback information semi-statically as $\{2, 5, 8, 12\}$, and the eNB indicates one of them in DCI, for example, the eNB indicates one of the lengths of a sequence of feedback information as 5, that is, the eNB can schedule transmission of at most five PDSCHs in the current joint feedback set, but the eNB actually schedules transmission of four PDSCHs in the current joint feedback set, so the UE transmits five bits of ACK/NACK feedback information to the eNB in the uplink sub-frame n.

Preferably the joint counter counts in a firstly-frequency domain and then-time domain order. Referring to FIG. 4, firstly the PDSCH scheduled over the active carriers, or the DCI for which an ACK/NACK feedback is required, in the sub-frame a is counted as 1, that is, feedback information b1 corresponding to the PDSCH or the DCI is arranged at the first bit position in the sequence of feedback information to be transmitted; then the PDSCH scheduled over the active carriers, or the DCI for which an ACK/NACK feedback is required, in the sub-frame b is further counted as 2, that is, feedback information b2 corresponding to the PDSCH or the DCI is arranged at the second bit position in the sequence of feedback information to be transmitted; then the PDSCH scheduled over the active carriers, or the DCI for which an ACK/NACK feedback is required, in the sub-frame c is further counted as 3, that is, feedback information b3 corresponding to the PDSCH or the DCI is arranged at the third bit position in the sequence of feedback information to be transmitted; and lastly the PDSCH scheduled over the active carriers, or the DCI for which an ACK/NACK feedback is required, in the sub-frame d is further counted as 4, that is, feedback information b4 corresponding to the PDSCH or the DCI is arranged at the fourth bit position in the sequence of feedback information to be transmitted, where response feedback information for the downlink sub-frame (a-d) is transmitted in the uplink sub-frame n. Accordingly the sequence of feedback information is obtained as {b1, b2, b3, b4, b5=NACK} according to the joint counter, where NACK is a placeholder, for example, if NACK=0 represents Null or Non-Acknowledgement, then correspondingly ACK may take the value of 1 to represent Acknowledgement. Stated otherwise, if the total number of bits of the feedback information, received by the UE in the joint feedback set, corresponding to the PDSCH, and/or the DCI for which response feedback information is required to be transmitted is A, where A is less than the length L of a sequence of feedback information indicated in the indicator, then the UE may set (L-A) bits of placeholder information in the sequence of feedback information.

As can be apparent, if the scheduling condition corresponding to this embodiment is handled as in the prior art, then the UE will feed 12 bits (i.e., 3 carriers multiplied by 4 downlink sub-frames) of ACK/NACK feedback information back to the eNB, but only 4 bits of them is useful information, and the other feedback information is redundant placeholder information. If the number of carriers to be aggregated is further increased, then the amount of redundant information thereof will be very large. With the technical solution according to the embodiment of the application, there is only 1 bit of redundant placeholder information in the resulting sequence of feedback information, thus significantly reducing the amount of redundant information in the sequence of feedback information.

In correspondence to the methods above, embodiments of the application further provide the following devices.

Figure 5:
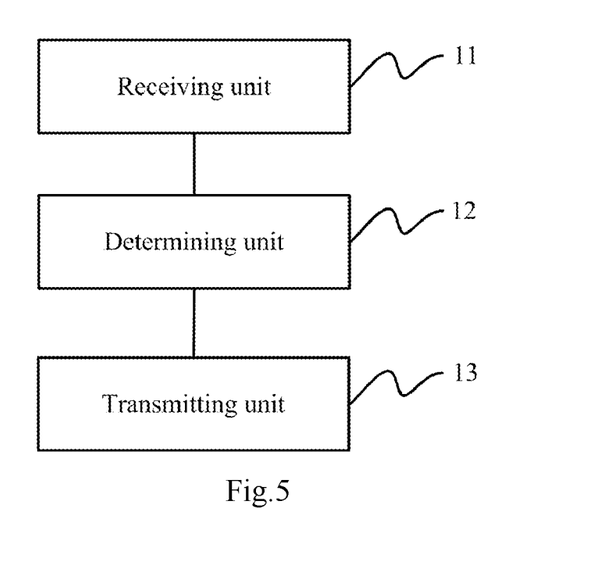
FIG. 5 is a schematic structural diagram of a device for transmitting feedback information according to an embodiment of the application.

Referring to FIG. 5, an embodiment of the application provides a device for transmitting feedback information, where the device includes:

a receiving unit 11 is configured to receive an indicator transmitted by a network side to indicate a length of a sequence of feedback information;

a determining unit 12 is configured to determine a sequence of feedback information according to the length of a sequence of feedback information, indicated in the indicator; and a transmitting unit 13 is configured to transmit a determined sequence of feedback information to the network side.

Preferably the transmitting unit transmits the determined sequence of feedback information to the network side in a Physical Uplink Control Channel (PUCCH) format, in which the sequence of feedback information can be carried, and which has the least capacity.

Preferably the receiving unit is further configured, before the UE receives the indicator transmitted by the network side to indicate the length of a sequence of feedback information:

to receive a set of lengths of a sequence of feedback information, transmitted by the network side, including P different lengths of a sequence of feedback information, {$L_1$, $L_2$, ..., $L_P$}, where $$L_j \le \sum_{i=1}^{N} C_i \cdot M_i,$$

j=1, 2, ..., P, P represents an integer more than 1, N represents the number of component carriers configured by the network side to be aggregated for the UE, $M_i$ represents the total number of downlink sub-frames for which feedback information is transmitted in an uplink sub-frame n over a component carrier i, and $C_i$ represents the largest number of transport blocks which can be transmitted in each downlink sub-frame over the component carrier i;

where the length of a sequence of feedback information indicated in the indicator belongs to the set of lengths of a sequence of feedback information.

Preferably the indicator is Downlink Control Information (DCI).

Preferably if the receiving unit receives a plurality of pieces of DCI in a joint feedback set, then each piece of DCI will indicate the same length of a sequence of feedback information, where the joint feedback set is a set of downlink sub-frames for which feedback information is transmitted in the same uplink sub-frame.

Preferably the receiving unit is further configured:

to obtain a joint counter from DCI scheduling transmission of a Physical Downlink Shared Channel (PDSCH), or DCI for which feedback information needs to be replied with, in the joint feedback set, where the joint counter indicates an order in which the DCI is received.

The determining unit is configured:

to determine the bit position, of feedback information corresponding to the PDSCH or the DCI, in the sequence of feedback information according to the joint counter; and to determine the sequence of feedback information according to the length of a sequence of feedback information indicated in the indicator, and the bit position.

Figure 6:
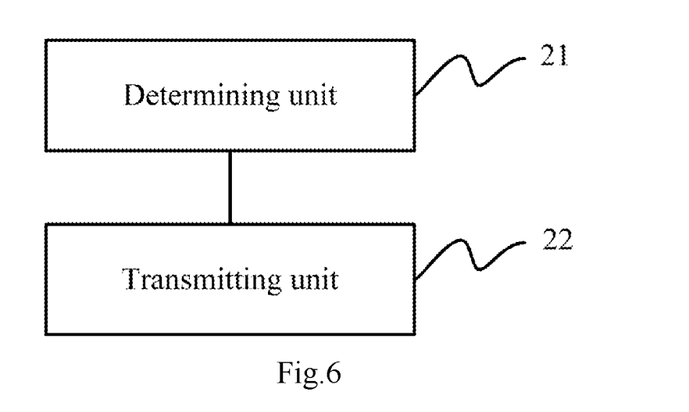
FIG. 6 is a schematic structural diagram of a device for controlling transmission of feedback information according to an embodiment of the application.

Referring to FIG. 6, an embodiment of the application provides a device for controlling transmission of feedback information at the network side, where the device includes:

a determining unit 21 is configured to determine a length of a sequence of feedback information to be indicated to a User Equipment (UE);

a transmitting unit 22 is configured to transmit an indicator indicating the length of a sequence of feedback information to the UE.

Preferably before the indicator indicating the length of a sequence of feedback information is determined, the transmitting unit is further configured to transmit a set of lengths of a sequence of feedback information, including P different lengths of a sequence of feedback information, {$L_1$, $L_2$, ..., $L_P$}, to the UE, where $$L_j \le \sum_{i=1}^{N} C_i \cdot M_i,$$

j=1, 2, ..., P, P represents an integer more than 1, N represents the number of component carriers configured by the network side to be aggregated for the UE, $M_i$ represents the total number of downlink sub-frames for which feedback information is transmitted in an uplink sub-frame n over a component carrier i, and $C_i$ represents the largest number of transport blocks which can be transmitted in each downlink sub-frame over the component carrier i; and the determining unit is configured to select one of the lengths of a sequence of feedback information in the set of lengths of a sequence of feedback information as the length of a sequence of feedback information to be indicated to the UE.

Preferably the indicator is Downlink Control Information (DCI).

Preferably the transmitting unit is configured:

to transmit a plurality of pieces of DCI, each of which indicates the same length of a sequence of feedback information, to the UE in a joint feedback set, where the joint feedback set is a set of downlink sub-frames for which feedback information is transmitted in the same uplink sub-frame.

Preferably the transmitting unit is further configured to set a joint counter in DCI scheduling transmission of a Physical Downlink Shared Channel (PDSCH), or DCI for which feedback information needs to be replied with, in the joint feedback set, where the joint counter indicates an order in which the DCI is transmitted, so that the UE determines the bit position, of feedback information corresponding to the PDSCH or the DCI, in the sequence of feedback information according to the joint counter.

Preferably after the indicator indicating the length of a sequence of feedback information is transmitted to the UE, the transmitting unit is further configured: to receive a sequence of feedback information with which the UE replies, where the sequence of feedback information is transmitted by the UE to the transmitting unit in a Physical Uplink Control Channel (PUCCH) format, in which the sequence of feedback information can be carried, and which has the least capacity.

The respective units above can be embodied as a processor or another physical device.

Figure 7:
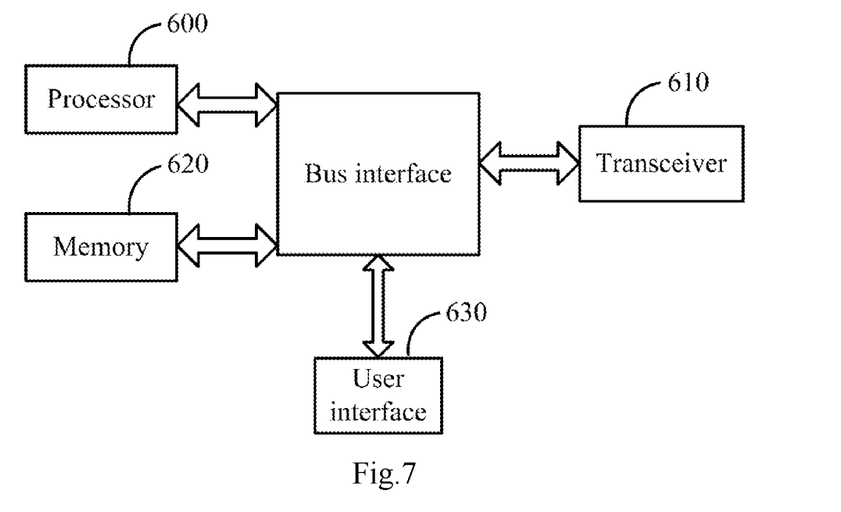
FIG. 7 is a schematic structural diagram of a second device for transmitting feedback information according to an embodiment of the application.

Referring to FIG. 7, an embodiment of the application provides another device for transmitting feedback information at the UE side, where the device includes:

a processor 600 is configured to read programs in a memory 620 to perform the processes of:

controlling a transceiver 610 to receive an indicator transmitted by a network side to indicate a length of a sequence of feedback information;

determining a sequence of feedback information according to the length of a sequence of feedback information, indicated in the indicator; and controlling the transceiver 610 to transmit a determined sequence of feedback information to the network side.

Preferably the processor 600 controls the transceiver 610 to transmit the determined sequence of feedback information to the network side in a Physical Uplink Control Channel (PUCCH) format, in which the sequence of feedback information can be carried, and which has the least capacity.

Preferably before the UE receives the indicator transmitted by the network side to indicate the length of a sequence of feedback information, the processor 600 further controls the transceiver 610 to:

receive a set of lengths of a sequence of feedback information, transmitted by the network side, including P different lengths of a sequence of feedback information, $\{L_1, L_2, \ldots, L_P\}$, where $$L_j \le \sum_{i=1}^{N} C_i \cdot M_i,$$

j=1, 2, . . . , P, P represents an integer more than 1, N represents the number of component carriers configured by the network side to be aggregated for the UE, $M_i$ represents the total number of downlink sub-frames for which feedback information is transmitted in an uplink sub-frame n over a component carrier i, and $C_i$ represents the largest number of transport blocks which can be transmitted in each downlink sub-frame over the component carrier i;

where the length of a sequence of feedback information indicated in the indicator belongs to the set of lengths of a sequence of feedback information.

Preferably the indicator is Downlink Control Information (DCI).

Preferably if the processor 600 controls the transceiver 610 to receive a plurality of pieces of DCI in a joint feedback set, then each piece of DCI will indicate the same length of a sequence of feedback information, where the joint feedback set is a set of downlink sub-frames for which feedback information is transmitted in the same uplink sub-frame.

Preferably the processor 600 is further configured:

to obtain a joint counter from DCI scheduling transmission of a Physical Downlink Shared Channel (PDSCH), or DCI for which feedback information needs to be replied with, in the joint feedback set, where the joint counter indicates an order in which the DCI is received;

and to determine the bit position, of feedback information corresponding to the PDSCH or the DCI, in the sequence of feedback information according to the joint counter; and to determine the sequence of feedback information according to the length of a sequence of feedback information, indicated in the indicator, and the bit position.

The transceiver 610 is configured to be controlled by the processor 600 to receive and transmit data.

Here in FIG. 7, the bus architecture can include any number of interconnecting buses and bridges to particularly link together various circuits including one or more processors represented by the processor 600, and one or more memories represented by the memory 620. The bus architecture can further link together various other circuits, e.g., peripheral devices, manostats, power management circuits, etc., all of which are well known in the art, so a further description thereof will be omitted in this context. The bus interface serves as an interface. The transceiver 610 can be a number of elements including a transmitter and a receiver which are units for communication with various other devices over a transmission medium. For different user equipments, a user interface 630 can also be an interface via which external or internal devices can be connected as appropriate, where the connected devices include but will not be limited to a keypad, a display, a speaker, a microphone, a joystick, etc.

The processor 600 is responsible for managing the bus architecture and performing normal processes, and the memory 520 can store data for use by the processor 500 in performing the operations.

Figure 8:
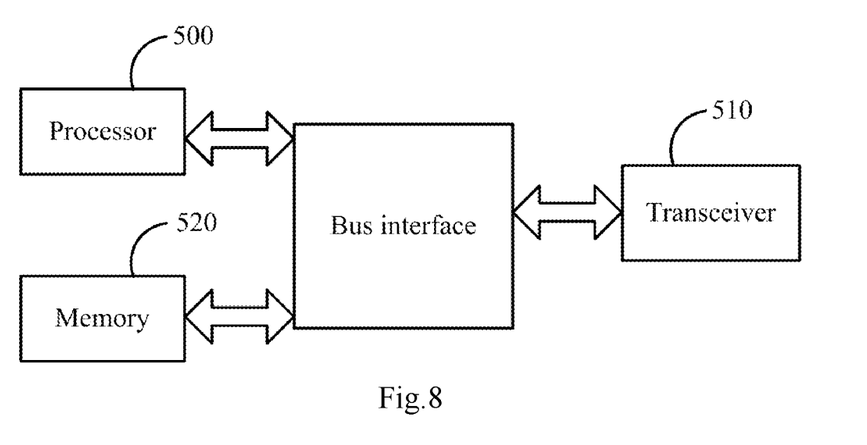
FIG. 8 is a schematic structural diagram of a second device for controlling transmission of feedback information according to an embodiment of the application.

Referring to FIG. 8, an embodiment of the application provides another device for controlling transmission of feedback information at the network side, where the device includes:

a processor 500 is configured to read programs in a memory 520 to perform the processes of:

determining a length of a sequence of feedback information to be indicated to a User Equipment (UE);

controlling a transceiver 510 to transmit an indicator indicating the length of a sequence of feedback information to the UE.

Preferably before the indicator indicating the length of a sequence of feedback information is determined, the processor 500 is further configured to control the transceiver 510 to transmit a set of lengths of a sequence of feedback information, including P different lengths of a sequence of feedback information, $\{L_1, L_2, \ldots, L_P\}$, to the UE, where $$L_j \le \sum_{i=1}^{N} C_i \cdot M_i,$$

j=1, 2, . . . , P, P represents an integer more than 1, N represents the number of component carriers configured by the network side to be aggregated for the UE, $M_i$ represents the total number of downlink sub-frames for which feedback information is transmitted in an uplink sub-frame n over a component carrier i, and $C_i$ represents the largest number of transport blocks which can be transmitted in each downlink sub-frame over the component carrier i; and the processor 500 selects one of the lengths of a sequence of feedback information in the set of lengths of a sequence of feedback information as the length of a sequence of feedback information to be indicated to the UE.

Preferably the indicator is Downlink Control Information (DCI).

Preferably the processor 500 controls the transceiver 510 to transmit a plurality of pieces of DCI, each of which indicates the same length of a sequence of feedback information, to the UE in a joint feedback set, where the joint feedback set is a set of downlink sub-frames for which feedback information is transmitted in the same uplink sub-frame.

Preferably the processor 500 sets a joint counter in DCI scheduling transmission of a Physical Downlink Shared Channel (PDSCH), or DCI for which feedback information needs to be replied with, in the joint feedback set, where the joint counter indicates an order in which the DCI is transmitted, so that the UE determines the bit position, of the feedback information corresponding to the PDSCH or the DCI, in the sequence of feedback information according to the joint counter.

Preferably after the indicator indicating the length of a sequence of feedback information is transmitted to the UE, the processor 500 further controls the transceiver 510:

to receive a sequence of feedback information with which the UE replies, where the sequence of feedback information is transmitted by the UE to the transceiver 510 in a Physical Uplink Control Channel (PUCCH) format, in which the sequence of feedback information can be carried, and which has the least capacity.

The transceiver 510 is configured to be controlled by the processor 500 to receive and transmit data.

Here in FIG. 8, the bus architecture can include any number of interconnecting buses and bridges to particularly link together various circuits including one or more processors represented by the processor 500, and one or more memories represented by the memory 520. The bus architecture can further link together various other circuits, e.g., peripheral devices, manostats, power management circuits, etc., all of which are well known in the art, so a further description thereof will be omitted in this context. A bus interface serves as an interface. The transceiver 510 can be a number of elements including a transmitter and a receiver which are units for communication with various other devices over a transmission medium. The processor 500 is responsible for managing the bus architecture and performing normal processes, and the memory 520 can store data for use by the processor 500 in performing the operations.

In summary, in the embodiments of the application, the set of lengths of a sequence of feedback information is configured semi-statically, and one of the lengths of a sequence of feedback information in the set is indicated dynamically in the DCI, so that the UE determines the length of a sequence of feedback information, at which ACK/NACK feedback information is transmitted in an uplink sub-frame, according to the indicated length of a sequence of feedback information, thus significantly reducing the amount of redundant information in the sequence of feedback information.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for transmitting feedback information, the method comprises:
   receiving, by a User Equipment (UE), an indicator transmitted by a network side to indicate a length of a sequence of feedback information, wherein the indicator is Downlink Control Information, DCI for scheduling transmission of a Physical Downlink Shared Channel, PDSCH and/or DCI for which feedback information needs to be replied with;
   determining, by the UE, a sequence of feedback information according to the length of a sequence of feedback information, indicated in the indicator; and
   transmitting, by the UE, a determined sequence of feedback information to the network side in a Physical Uplink Control Channel (PUCCH);
   wherein the method further comprises: obtaining, by the UE, a joint counter from DCI scheduling transmission of a Physical Downlink Shared Channel (PDSCH), or DCI for which feedback information needs to be replied with, in a joint feedback set, wherein the joint counter indicates an order in which the DCI is received, the joint feedback set is a set of downlink sub-frames for which feedback information is transmitted in a same uplink sub-frame; and
   determining, by the UE, the sequence of feedback information according to the length of a sequence of feedback information, indicated in the indicator comprises:
   determining, by the UE, a bit position, of feedback information corresponding to the PDSCH or the DCI, in the sequence of feedback information according to the joint counter; and
   determining, by the UE, the sequence of feedback information according to the length of a sequence of feedback information, indicated in the indicator, and the bit position.

2. The method according to claim 1, wherein the UE transmits the determined sequence of feedback information to the network side in a Physical Uplink Control Channel (PUCCH) format, in which the sequence of feedback information can be carried, and which has the least capacity.

3. The method according to claim 1, wherein before the UE receives the indicator transmitted by the network side to indicate the length of a sequence of feedback information, the method further comprises:
   receiving, by the UE, a set of lengths of a sequence of feedback information, transmitted by the network side, comprising P different lengths of a sequence of feedback information, $\{L_1, L_2, \ldots, L_P\}$, wherein $$L_j \le \sum_{i=1}^{N} C_i \cdot M_i,$$

j=1, 2, . . . , P, P represents an integer more than 1, N represents the number of component carriers configured by the network side to be aggregated for the UE, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i;
   wherein the length of a sequence of feedback information indicated in the indicator belongs to the set of lengths of a sequence of feedback information.

4. The method according to claim 1, wherein if the UE receives a plurality of pieces of DCI in a joint feedback set, then each piece of DCI will indicate a same length of a sequence of feedback information, wherein the joint feedback set is a set of downlink sub-frames for which feedback information is transmitted in a same uplink sub-frame.

5. The method according to claim 1, wherein the joint counter counts in a firstly-frequency domain and then-time domain order.

6. The method according to claim 1, wherein if a total number of bits of the feedback information, received by the UE in the joint feedback set, corresponding to the PDSCH, and/or the DCI for which response feedback information is required to be transmitted is A, wherein A is less than a length L of a sequence of feedback information indicated in the indicator, then the UE may set (L-A) bits of placeholder information in the sequence of feedback information.

7. A method for controlling transmission of feedback information, the method comprises:
   determining, by a network side, a length of a sequence of feedback information to be indicated to a User Equipment (UE);
   transmitting, by the network side, an indicator indicating the length of a sequence of feedback information to the UE in a Physical Uplink Control Channel (PUCCH);
   wherein the indicator is Downlink Control Information, DCI for scheduling transmission of a Physical Downlink Shared Channel, PDSCH and/or DCI for which feedback information needs to be replied with;
   wherein the method further comprises:
   setting, by the network side, a joint counter in DCI scheduling transmission of a Physical Downlink Shared Channel (PDSCH), or DCI for which feedback information needs to be replied with, in a joint feedback set, wherein the joint counter indicates an order in which the DCI is transmitted, so that the UE determines a bit position, of feedback information corresponding to the PDSCH or the DCI, in the sequence of feedback information according to the joint counter, and the joint feedback set is a set of downlink sub-frames for which feedback information is transmitted in a same uplink sub-frame.

8. The method according to claim 7, wherein before the network side determines the indicator indicating the length of a sequence of feedback information, the method further comprises: transmitting, by the network side, a set of lengths of a sequence of feedback information, including P different lengths of a sequence of feedback information, $\{L_1, L_2, \ldots, L_P\}$, to the UE, wherein $$L_j \le \sum_{i=1}^{N} C_i \cdot M_i,$$

j=1, 2, . . . , P, P represents an integer more than 1, N represents the number of component carriers configured by the network side to be aggregated for the UE, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i; and
   determining, by the network side, the length of a sequence of feedback information to be indicated to the UE comprises: selecting, by the network side, one of the lengths of a sequence of feedback information in the set of lengths of a sequence of feedback information as the length of a sequence of feedback information to be indicated to the UE.

9. The method according to claim 7, wherein transmitting, by the network side, the indicator indicating the length of a sequence of feedback information to the UE comprises:
transmitting, by the network side, a plurality of pieces of DCI, each of which indicates a same length of a sequence of feedback information, to the UE in a joint feedback set, wherein the joint feedback set is a set of downlink sub-frames for which feedback information is transmitted in a same uplink sub-frame.

10. The method according to claim 7, wherein the joint counter counts in a firstly-frequency domain and then-time domain order.

11. The method according to claim 7, wherein after the network side transmits the indicator indicating the length of a sequence of feedback information to the UE, the method further comprises:
receiving, by the network side, a sequence of feedback information with which the UE replies, wherein the sequence of feedback information is transmitted by the UE to the network side in a Physical Uplink Control Channel (PUCCH) format, in which the sequence of feedback information can be carried, and which has the least capacity the least capacity.

12. The method according to claim 11, wherein if a total number of bits of the feedback information, received by the UE in a joint feedback set, corresponding to the PDSCH, and/or the DCI for which response feedback information is required to be transmitted is A, wherein A is less than a length L of a sequence of feedback information indicated in the indicator, then the UE may set (L-A) bits of placeholder information in the sequence of feedback information.

13. A device for transmitting feedback information, the device comprises at least one processor and a memory, wherein the memory is configured to store computer readable program codes, the at least one processor is configured to execute the computer readable program codes to:
receive an indicator transmitted by a network side to indicate a length of a sequence of feedback information, wherein the indicator is Downlink Control Information, DCI for scheduling transmission of a Physical Downlink Shared Channel, PDSCH and/or DCI for which feedback information needs to be replied with;
determine a sequence of feedback information according to the length of a sequence of feedback information, indicated in the indicator; and
transmit a determined sequence of feedback information to the network side in a Physical Uplink Control Channel (PUCCH);
wherein the at least one processor is further configured to execute the computer readable program codes to:
obtain a joint counter from DCI scheduling transmission of a Physical Downlink Shared Channel (PDSCH), or DCI for which feedback information needs to be replied with, in a joint feedback set, wherein the joint counter indicates an order in which the DCI is received, the joint feedback set is a set of downlink sub-frames for which feedback information is transmitted in a same uplink sub-frame;
determine a bit position, of feedback information corresponding to the PDSCH or the DCI, in the sequence of feedback information according to the joint counter; and determine the sequence of feedback information according to the length of a sequence of feedback information, indicated in the indicator, and the bit position.

14. The device according to claim 13, wherein the at least one processor is further configured to execute the computer readable program codes to:
transmit the determined sequence of feedback information to the network side in a Physical Uplink Control Channel (PUCCH) format, in which the sequence of feedback information can be carried, and which has the least capacity.

15. The device according to claim 13, wherein the at least one processor is further configured to execute the computer readable program codes to:
before the device receives the indicator transmitted by the network side to indicate the length of a sequence of feedback information, receive a set of lengths of a sequence of feedback information, transmitted by the network side, including P different lengths of a sequence of feedback information, $\{L_1, L_2, L_P\}$, wherein $$L_j \leq \sum_{i=1}^{N} C_i \cdot M_i,$$

j=1, 2, . . . , P, P represents an integer more than 1, N represents the number of component carriers configured by the network side to be aggregated for the device, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i;
wherein the length of a sequence of feedback information indicated in the indicator belongs to the set of lengths of a sequence of feedback information.

16. The device according to claim 13, wherein if the device receives a plurality of pieces of DCI in a joint feedback set, then each piece of DCI will indicate a same length of a sequence of feedback information, wherein the joint feedback set is a set of downlink sub-frames for which feedback information is transmitted in a same uplink sub-frame.

17. The device according to claim 13, wherein the at least one processor is further configured to execute the computer readable program codes to:
if a total number of bits of the feedback information, received by the device in the joint feedback set, corresponding to the PDSCH, and/or the DCI for which response feedback information is required to be transmitted is A, wherein A is less than a length L of a sequence of feedback information indicated in the indicator, set (L-A) bits of placeholder information in the sequence of feedback information.

18. The device according to claim 17, wherein the joint counter counts in a firstly-frequency domain and then-time domain order.

19. A device for controlling transmission of feedback information, the device comprises at least one processor and a memory, wherein the memory is configured to store computer readable program codes, the at least one processor is configured to execute the computer readable program codes to:

determine a length of a sequence of feedback information to be indicated to a User Equipment (UE);

transmit an indicator indicating the length of a sequence of feedback information to the UE in a Physical Uplink Control Channel (PUCCH);

wherein the indicator is Downlink Control Information, DCI for scheduling transmission of a Physical Downlink Shared Channel, PDSCH and/or DCI for which feedback information needs to be replied with;

wherein the at least one processor is further configured to execute the computer readable program codes to:

set a joint counter in DCI scheduling transmission of a Physical Downlink Shared Channel (PDSCH), or DCI for which feedback information needs to be replied with, in a joint feedback set, wherein the joint counter indicates an order in which the DCI is transmitted, so that the UE determines a bit position, of feedback information corresponding to the PDSCH or the DCI, in the sequence of feedback information according to the joint counter, and the joint feedback set is a set of downlink sub-frames for which feedback information is transmitted in a same uplink sub-frame.

20. The device according to claim 19, wherein the at least one processor is further configured to execute the computer readable program codes to:

before the indicator indicating the length of a sequence of feedback information is determined, transmit a set of lengths of a sequence of feedback information, including P different lengths of a sequence of feedback information, $\{L_1, L_2, \ldots, L_P\}$, to the UE, wherein $$L_j \leq \sum_{i=1}^{N} C_i \cdot M_i,$$

$j=1, 2, \ldots, P$, P represents an integer more than 1, N represents the number of component carriers configured by a network side to be aggregated for the UE, $M_i$ represents a total number of downlink sub-frames for which feedback information is transmitted in an uplink sub-frame n over a component carrier i, and $C_i$ represents a largest number of transport blocks which can be transmitted in each downlink sub-frame over the component carrier i; and select one of the lengths of a sequence of feedback information in the set of lengths of a sequence of feedback information as the length of a sequence of feedback information to be indicated to the UE.

21. The device according to claim 19, wherein the at least one processor is further configured to execute the computer readable program codes to:

transmit a plurality of pieces of DCI, each of which indicates a same length of a sequence of feedback information, to the UE in a joint feedback set, wherein the joint feedback set is a set of downlink sub-frames for which feedback information is transmitted in a same uplink sub-frame.

22. The device according to claim 19, wherein the joint counter counts in a firstly-frequency domain and then-time domain order.

23. The device according to claim 19, wherein the at least one processor is further configured to execute the computer readable program codes to:

after the indicator indicating the length of a sequence of feedback information is transmitted to the UE, receive a sequence of feedback information with which the UE replies, wherein the sequence of feedback information is transmitted by the UE to the device in a Physical Uplink Control Channel (PUCCH) format, in which the sequence of feedback information can be carried, and which has the least capacity.

24. The device according to claim 23, wherein if a total number of bits of the feedback information, received by the UE in a joint feedback set, corresponding to the PDSCH, and/or the DCI for which response feedback information is required to be transmitted is A, wherein A is less than a length L of a sequence of feedback information indicated in the indicator, then (L-A) bits of placeholder information may be set in the sequence of feedback information.

* * * * *